United States Patent [19]
Ware, Jr. et al.

[11] 3,865,931
[45] Feb. 11, 1975

[54] PYRIDYL PHENYL CARBAMATE RODENTICIDES

[75] Inventors: J. Edgar Ware, Jr., Quakertown; Edward E. Kilbourn; David L. Peardon, both of Chalfont, all of Pa.

[73] Assignee: Rohm and Haas Company, Philadelphia, Pa.

[22] Filed: Apr. 19, 1972

[21] Appl. No.: 245,608

Related U.S. Application Data

[63] Continuation-in-part of Ser. No. 235,015, March 15, 1972, abandoned.

[52] U.S. Cl. .................................. 424/84, 424/263
[51] Int. Cl. ...... A01n 17/14, A01n 9/00, A01n 9/22
[58] Field of Search .............. 424/17, 84, 263, 300; 260/294.8, 295 CA

[56] References Cited
UNITED STATES PATENTS

| | | | |
|---|---|---|---|
| 2,681,879 | 6/1954 | Gysin et al. | 424/84 |
| 3,284,461 | 11/1966 | Wilbert et al. | 260/295 CA |
| 3,428,642 | 2/1969 | Debay et al. | 260/295 CA |
| 3,676,457 | 7/1972 | Hubele et al. | 424/300 |

FOREIGN PATENTS OR APPLICATIONS

| | | | |
|---|---|---|---|
| 1,132,988 | 11/1968 | Great Britain | 260/295 CA |

*Primary Examiner*—Albert T. Meyers
*Assistant Examiner*—D. W. Robinson

[57] ABSTRACT

Certain 3-pyridylmethyl-N-4'-substituted phenyl carbamates are useful as rodenticides, e.g., in baits or tracking powders. The 4' substituent may be $-NO_2$, $-CN$, $-CF_3$, $-CCl_3$, $-SCH_3$, $-SOCH_3$, $-SO_2CH_3$, or $SO_2NR_2$ where R is $-H$ or lower alkyl.

28 Claims, No Drawings

PYRIDYL PHENYL CARBAMATE RODENTICIDES

CROSS-REFERENCE TO RELATED APPLICATION

This is a continuation-in-part of application Ser. No. 235,015, filed Mar. 15, 1972 now abandoned.

BACKGROUND OF THE INVENTION

1. FIELD OF THE INVENTION

The present invention relates to rodenticides and more particularly to the use of compositions containing certain pyridyl phenyl carbamates for the control and extermination of pest rodents.

2. DESCRIPTION OF THE PRIOR ART

The common rat, Rattus norvegicus, is vicious and constantly poses a serious threat to the health and well being of man. Rats and mice are destructive animals and a serious nuisance, causing millions of dollars damage annually to farms, agronomic crops, homes, food processing plants and many other businesses. Rats bite at least 14,000 (possibly up to 60,000) people every year, according to the U.S. Public Health Service, and are known carriers of over 35 contagious diseases including bubonic plague, trichinosis, typhus, rat bite fever, amoebic dysentery, tuberculosis, infectious jaundice and rabies. During the years from 1898 to 1923, almost 11 million deaths were caused by rat-borne plague.

Use of rodenticides, fumigants, sprays and traps are the primary methods employed for the control of pest rodents. By "pest rodents" we refer not only to members of the order Rodentia but also to those of Lagomorpha, which cause health hazards or economic loss unless kept in check. Rodenticides may be used in the form of a tracking powder or a bait or may be applied as a spray on the rodent's natural foodstuffs. The rodenticides used as a bait are of two classes: single-dose and multi-dose. Multi-dose rodenticides are usually selected over single-dose rodenticides, as they have been safer in the past than the available single-dose rodenticides. The multi-dose rodenticides are anti-coagulants, including a number of different 4-hydroxy coumarin and 1,3-indandione compounds. These multi-dose rodenticides consumed in small daily amounts have a lethal effect on rats and mice after liver stores of vitamin K have been depleted. Anti-coagulants are less effective on mice than rats, as mice are considered to be nibblers and do not usually consume an adequate amount of treated bait to have a lethal effect. A single-dose rodenticide which would be relatively safe to the person handling the material and to non-target species of animals and yet effective on a variety of pest rodents is highly desirable.

SUMMARY OF THE INVENTION

Many compounds are toxic to rodents. However, very few of these compounds are anywhere near suitable for use as a rodenticide because it is necessary for the pest rodent to consume voluntarily a sufficient amount of the poison even though sufficient untreated food may also be available. In bait rodenticides, feed acceptance is the key to excellence, and in all rodenticides safety and efficacy are highly important.

The pyridyl phenyl carbamates of the present invention are so highly toxic to a wide variety of pest rodents that a single dose is sufficient; yet they are relatively safe for use in the presence of other species which may inadvertently ingest limited quantities of the rodenticide. Furthermore, rats and other pest rodents willingly consume the compounds of the present invention in sufficiently lethal amounts when present in baits. Alternatively the compounds may be employed in compositions to be sprayed on natural foodstuffs. They may also be employed in tracking powder, especially for use against mice, which habitually clean their paws by licking.

The compounds of the present invention have the formula:

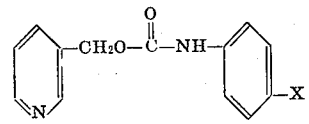

wherein X is selected from the group consisting of —NO$_2$, —CN, —CF$_3$, —CCl$_3$, —SCH$_3$, —SOCH$_3$, —SO$_2$CH$_3$, and —SO$_2$NR$_2$ where R is —H or lower alkyl. It is to be noted that each of the para substituents on the phenyl ring is highly electron-withdrawing (i.e. its Hammett substituent constant $\sigma$ is greater than about +0.23) except for the —SCH$_3$ group. This apparent anomaly is explained by the fact that —SCH$_3$ substituents are commonly oxidized to —SOCH$_3$ in vivo.

DESCRIPTION OF THE PREFERRED EMBODIMENTS

Preparation of compound

The compounds of the present invention may be prepared by permitting equimolar amounts of substituted phenylisocyanate and 3-pyridylcarbinol to react in the presence of an inert solvent, e.g., benzene. Examples 1, 2 and 3 describe the preparation of the compounds of the present invention. All temperatures are in degrees Celsius.

EXAMPLE 1

Preparation of 3-Pyridylmethyl-N-4'-nitrophenylcarbamate p-Nitrophenylisocyanate (0.1 mole) was added to a solution of 3-pyridylcarbinol (0.1 mole) in 300 ml. of benzene. An exothermic reaction took place and a yellow solid formed. The suspension was heated to reflux and then stirred for 2 hours. The suspension was then cooled and filtered, affording 27g (99 percent yield) of a crude product; melting point 230–231° (decomposed). The product was purified by recrystallization from 2-methoxyethanol (Methyl Cellosolve).

EXAMPLE 2

The process described in Example 1 was repeated with another substituted phenylisocyanate, with the following results:

| Substituent | Yield | Melting Point |
| --- | --- | --- |
| p-CCl$_3$ | 34 % | 136°–148° (decomp) |

EXAMPLE 3

Alternative Preparation of 3-Pyridylmethyl-N-4'-nitrophenylcarbamate

Commercial p-nitrophenylisocyanate (100 g., Eastman Organic Chemicals) was purified by slurrying in 850 ml. of dry chlorobenzene for 15 minutes under anhydrous conditions and then vacuum filtering. The 26 g. of solid was discarded. To the filtrate, containing 74 g. (0.45 mole) of pure p-nitrophenylisocyanate in the 850 ml. chlorobenzene, was added dropwise 49.2 g. (0.45 mole) of 3-pyridylcarbinol over a period of 30 minutes. The temperature rose to 50°. After about 1 percent of the pyridylcarbinol had been added, a precipitate began to form, and after about 40 percent addition, the suspension showed considerable thickening. The suspension was stirred at room temperature overnight. Throughout the reaction, efficient stirring and anhydrous conditions were maintained. The solid product was recovered from the reaction mixture by filtration, washed thoroughly with cold acetone and dried in a vacuum oven, affording 123.2 g (100 percent yield) of product; melting point 232° – 234° (decomposed).

EXAMPLE 4

Preparation of 3-Pyridylmethyl N-4' cyanophenylcarbamate p-Tolysulfonylisocyanate (39.4 g., 0.2 mole) in 100 ml. of ether was added dropwise to a solution of 4-aminobenzonitrile (23.6 g., 0.2 mole) in 300 ml. of ether. Reaction took place immediately with the formation of a white solid. After stirring for 1 hr. at room temperature, the suspension was filtered, and the white solid which was isolated was washed with ether and dried. The sulfonylurea weighed 59 g. and melted at 185° – 195°.

The sulfonylurea was decomposed in vacuo at 1 mm. Hg using a shortpath heated tube. Since this apparatus did not have a ground glass temperature joint, it was not possible to record the distillation temperature. There was obtained 14 g. of 4-cycanophenylisocyanate.

4-Cyanophenylisocyanate (13.5 g., 0.1 mole) was dissolved in dry acetonitrile (50 ml.) and added to a solution of 3-pyridyl carbinol (10.9 g., 0.1 mole) in dry acetonitrile (200 ml.). Reaction appeared complete in 5 min., but the suspension was stirred for an additional hour and then filtered. After washing with benzene and drying, the crude product amounted to 23.4 g.; melting point 175° – 182°.

Chromatography over alumina using acetone as the eluant afforded 18 g. (71 percent) of product; melting point 205 – 207°. The product was recrystallized from 95 percent ethanol to afford a white solid; melting point 205° – 207°.

EXAMPLE 5

Preparation of 3-pyridylmethyl N-(4'-trifluoromethyl phenyl) Carbamate

To a solution of 2.5 g. (0.023 mole) of 3-pyridylcarbinol in 50 ml. of benzene containing 0.1 g of Dabco catalyst (1,4-diazabicyclo [2,2,2] octane) was added, dropwise, a solution of 43 g. (0.023 mole) of p-trifluoromethyl-phenyl isocyanate in 50 ml. of benzene. A temperature rise from 23° to 35° was noted during the addition, and a white precipitate formed. After stirring for 1 hr., the mixture was filtered, and the solid product was air-dried. There was obtained 6.3 g. (93 percent of theory) of product; melting point 173° – 175° (decomposed).

EXAMPLE 6

Preparation of 3-pyridylmethyl N-(4'-methylthiophenyl) Carbamate

To a solution of 4.4 g (0.04 mole) of 3-pyridylcarbinol in 50 ml. of benzene containing 0.1 g of Dabco catalyst was added, dropwise, a solution of 6.6 g (0.04 mole) of p-methylthiophenyl isocyanate (New Haven Chemicals) in 50 ml. of benzene. During the addition a white solid separated and the temperature rose from 23°C to 34°C. The mixture was stirred at ambient temperature for 16 hr. and the product was filtered off. After oven-drying in vacuo there was obtained 10.4 g. (95% yield); melting point 133° – 135°.

EXAMPLE 7

Preparation of 3-pyridylmethyl N-(4'-methylsulfinyl-phenyl) Carbamate

Quinoline-bromine complex was prepared by adding 3.2 g. (0.02 mole) of bromine in 50 ml. of CCl$_4$ to a solution of 2.6 g. (0.02 mole) of quinoline in 50 ml. of CCl$_4$. A yellow solid separated which was filtered off and air-dried. The yield was 3.5 g. (60 percent). To a solution of 2.7 g. (0.01 mole) of 3-pyridylmethyl N-(4'-methylthiophenyl) carbamate in 100 ml. of 70 percent aqueous acetic acid was added, portionwise, 2.7 g. (0.01 mole) of the quinoline-bromine complex. The mixture was stirred at ambient temperature for 15 min. and poured into 100 ml. of water. A negligible amount of solid formed and was removed by filtration. The filtrate was made alkaline with 25 percent aqueous NaOH, and a white precipitate formed which was filtered off and recrystallized from aqueous ethanol. There was obtained 0.5 g. of recrystallized product, melting point 118° – 121°, which proved to be a mixture of two components by thin layer chromatography. The filtrate was concentrated to near-dryness, yielding a white solid product which was filtered off and oven-dried in vacuo, melting point 139° – 143°, yield 1.0 g. (34 percent).

EXAMPLE 8

Preparation of 3-pyridylmethyl-N-(4'-methylsulfonyl-phenyl) Carbamate

To an ice-cold slurry of 6.2 g. (0.036 mole) of m-chloroperbenzoic acid in 100 ml. of benzene was added, portionwise, 4.1 g. (0.015 mole) of 3-pyridylmethyl-N-(4'-methylthiophenyl) carbamate, keeping the temperature below 10°. When the addition was complete, the mixture was stirred at ambient temperature for 16 hr. Removal of the acidic by-product was accomplished by adding 100 ml. of saturated sodium carbonate solution, stirring for 1 hr., and filtering. The solid product was oven-dried in vacuo to give 3.3 g. (72 percent yield) of crude product; melting point 169° – 173°(decomposed). Recrystallization from 95 percent ethanol raised the melting point to 175° – 178° (decomposed).

EXAMPLE 9

Preparation of 3-Pyridylmethyl N-4'-sulfamoylphenyl Carbamate

To a solution of 3.25 g. (0.05 mole) sodium azide in 15 ml. water and 15 ml. acetone was added dropwise a solution of 8.25 g. (0.0375 ml.) p-sulfamoyl benzoyl chloride in 75 ml. of acetone. The addition took place over a 15 minute period with the temperature being maintained at 0°. The mixture was stirred at 0° for one hour, after which there was added 150 ml. of water and 100 ml. of toluene. The suspension formed was vacuum-filtered, and the first crop of p-sulfamoyl carbonyl azide was air-dried for 15 minutes (melting point 134° violent decomp.). The p-sulfamoyl carbonyl azide was dissolved in 200 ml. of anhydrous ethylene glycol dimethyl ether, hereinafter "glyme," dried over magnesium sulfate, and reacted in the following manner:

To a solution of p-sulfamoyl carbonyl azide in 200 ml. of anhydrous glyme was added dropwise 7.25 g. (0.0665 mole) of 3-pyridyl carbinol. The resultant solution was refluxed and stirred for 3 hours and was let stand for 18 hours. The suspension formed was vacuum-filtered to remove 0.5 g. of bis-p-sulfamoylphenylurea. The filtrate was poured into an excess of ether, and the suspension formed was vacuum-filtered to afford 2 g. (17.3 percent yield) of product; melting point 174° (decomposed).

EXAMPLE 10

Preparation of 3-Pyridylmethyl N-4',N,N-diethylsulfonamidophenyl Carbamate

To a solution of 240 g. (0.303 mole) of 12.5 percent phosgene in benzene at 5° was added 14 g. (0.0615 mole) of p-N,N-diethylsulfonamido aniline. The mixture was stirred at 5° for 1 hour and at room temperature for 18 hours. The fine suspension was then refluxed and stirred for 5 hours and was concentrated in vacuo. The resultant oil was vacuum distilled at 150° – 153°/0.3 mm Hg to give 11.3 g. of p-N,N-diethylsulfonamidophenyl isocyanate, melting point 79° – 81°.

A solution of 1.5 g. (0.0059 mole) p-N,N-diethylsulfonamidophenyl isocyanate and 0.267 g. (0.0059 mole) of 3-pyridyl carbinol in 25 ml. of anhydrous glyme was refluxed and stirred for 4 hours and was concentrated in vacuo. The resultant oil was slurried in 100 ml. of refluxing ether, cooled, and vacuum-filtered affording 1 g. (46.5 percent yield) of product, melting point 113° – 115°.

Formulation for use

The compounds of the present invention may be formulated into rodenticide compositions such as baits, tracking powders, and sprays. A bait comprises an edible carrier and the toxicant, optionally with a preservative to prevent insect infestation, mold growth or rancidity. The edible carrier may be a semi-moist material such as canned cat or dog food or garbage such as apples, eggs, bacon, etc., but it is generally preferred to use a dry edible carrier as this remains acceptable for longer periods. The dry carrier may be a combination of natural food products such as whole ground corn, steel cut oats, sugar, molasses, rice, vegetable oil, salt, dehydrated fruit, fish meal, tankage or wheat. When necessary to use in damp locations, the matrix may be a water repellant material such as paraffin wax.

The compounds of the present invention may be incorporated as toxicant in bait formulations, either alone or in combination with other toxicants. When used as the sole toxicant in baits, the compounds of the present invention may be used in any rodenticidally effective concentration.

Depending on the susceptibility of the rodents to the toxicant and the amount of formulated bait generally consumed, concentrations as low as 0.1 percent, and especially when intended for mice, even lower than 0.05 percent may be employed. A typical bait may contain between about 0.5 percent and 1.5 percent of the toxicant by weight. We have found to our surprise that there is no upper limit to the amount of compound which may be present in a bait. Rats and mice accept the compounds of the present invention so well that even when offered free choice between untreated basal ration and a bait consisting entirely of one of the present compounds, they ingest rodenticidally sufficient quantities of the compound. Example 11 describes the formulation of a suitable bait, although wide variations in formulation for different conditions of use are of course expected.

Tracking powders, which are particularly effective against mice, may be either a compound of the present invention in finely powdered form or a mixture of the compound with a powdered carrier, e.g., talc, sugar, milk powder, Indian corn meal, fish meal, cornstarch, flour, and bentonite, or the like, or any combination thereof which tends to induce the animals contaminated with the preparation to lick themselves more thoroughly. In tracking powders, the compounds of the present invention may be incorporated in amounts from 100 percent down to 0.75 percent by weight, or somewhat less with proper formulation. Example 12 describes the preparation of a suitable tracking powder.

EXAMPLE 11

Bait Formulation

Each of the compounds of Examples 1 – 10 was blended with the basal ration in a Waring laboratory blender to form 50 grams of a homogeneous premix. The amount of compound utilized was determined by the percentage of active material desired in the feed. The formula for the basal ration is shown below, all percentages by weight:

| | |
|---|---|
| Crude ground corn | 65% |
| Steel cut oats | 25% |
| Powdered sugar | 5% |
| Corn oil | 5% |

The 50 grams of premix containing the toxicant were then mixed with an additional 450 grams of basal ration. These components were mixed in a Little Ford Lodige mixer for 3 minutes. These bait formulations were found effective when presented to rats given free choice between the bait and untreated basal ration in paired preference tests. Examples of such testing follow.

Paired Preference Test

Sexually matured albino rats from Huntington Farms, Inc. of West Conshohocken, Pa., or Norway rats (*Rattus norvegicus*) from the U.S. Department of the Interior Pest Control Laboratory at Purdue University, or feral mice (*Mus musculus*) trapped on farms in the vicinity of Quakertown, Pa., were used. When caged individually, they were provided with dual feed cups and separate water devices. When caged in a communal tank, they were offered a multiplicity of feed cups and water devices. The basal ration was offered in excess of daily feed requirements in each of two feeders: one treated with the test compound and one without. For each test, equal numbers of each sex were used.

The gross weight of each feed container and its feed were determined daily and returned to the starting weight by addition of complete replacement of the given diet. The position of the bait and the laboratory diet cups in the cage were reversed every 24 hours to counter any feeding position habit of the rat. The test rats had free choice between treated and untreated feed. Mortalities were recorded daily.

To meet the criteria for a single-dose product, a rodenticide in this initial test must kill 75 percent of the rats within 8 days, where the poison bait is available for the first 72 hours of this period.

The results of representative paired preference tests of 3-pyridylmethyl-N-4'-nitrophenyl carbamate on individually caged Norway rats are shown in Table I. Samples A through D are different batches prepared according to Example 1. Samples E and F were prepared according to Example 3.

Table I

Paired Preference Test of
3-Pyridylmethyl-N-4'-nitrophenyl carbamate
Using Individually Caged Norway Rats

| Compound in Basal Ration (parts per million) | Rats killed within 8 days/ Rats in test | Sample |
|---|---|---|
| 100,000 | 4/4 | D |
| 50,000 | 4/4 | B |
| 20,000 | 4/4 | B |
| 15,000 | 4/4 | B |
| 10,000 | 4/4 | B |
| 5,000 | 4/4 | B |
| 3,000 | 19/20 | A |
| 2,000 | 17/20 | A |
| 2,000 | 4/4 | E |
| 1,000 | 4/4 | E |
| 500 | 0/4 | E |

The results of paired preference tests of 3-pyridylmethyl-N-4'-nitrophenyl carbamate using 20 rats housed in a communal "tank" are shown in Table II. This is a stringent test, since the more resistant animals may learn to avoid the bait by observing the toxic effects on their cage-mates. At the 5,000 p.p.m. level, the requirement of 90 percent mortality was satisfied.

Table II

Paired Preference Test of
3-Pyridylmethyl-N-4'-nitrophenyl carbamate
Using Norway Rats in a Communal Tank

| Compound in Basal Ration (parts per million) | Rats killed within 8 days/ Rats in Test | Sample |
|---|---|---|
| 10,000 | 18/20 | C |
| 5,000 | 18/20 | F |
| 3,000 | 15/20 | B |

Feral mice were similarly subjected to paired preference tests of 3-pyridylmethyl-N-4'-nitrophenyl carbamate with the results shown in Table III.

TABLE III

Paired Preference Test of
3-Pyridylmethyl-N-4'-nitrophenyl carbamate
Using Individually Caged Feral Mice

| Compound in Basal Ration (parts per million) | Mice killed in 8 days/ Mice in test | Sample |
|---|---|---|
| 100,000 | 4/4 | E |
| 50,000 | 4/4 | E |
| 10,000 | 4/4 | C |
| 5,000 | 4/4 | C |
| 4,000 | 3/4 | C |
| 3,000 | 3/4 | C |
| 2,000 | 4/4 | C |
| 1,000 | 3/4 | C |
| 500 | 4/4 | E |

Albino rats were similarly subjected to paired preference tests, with the results shown in Table IV. The first column identifies the compound by the substituent at the 4' position.

TABLE IV

Paired Preference Test of
3-Pyridylmethyl-N-4'-substituted phenyl carbamate
Using Individually Caged Albino Rats

| 4' Substituent | Compound in Basal Ration (parts per million) | Rats killed in 8 days/ Rats in test |
|---|---|---|
| —$NO_2$(Sample E) | 50,000 | 2/2 |
| (Sample D) | 1,000 | 0/2 |
| —CN | 3,000 | 4/4 |
| —$CF_3$ | 3,000 | 4/4 |
| —$SCH_3$ | 50,000 | 2/2 |
|  | 3,000 | 4/4 |
|  | 1,000 | 2/2 |
| —$SOCH_3$ | 3,000 | 4/4 |
| —$SO_2CH_3$ | 50,000 | 2/2 |
|  | 3,000 | 4/4 |
|  | 1,000 | 2/2 |
| —$SO_2NH_2$ | 50,000 | 2/2 |
|  | 3,000 | 4/4 |
|  | 1,000 | 2/2 |

EXAMPLE 12

Tracking Powder

The active compound is finely pulverized by mortar and pestle to form a 100 percent active tracking powder. To form a 5 percent active material, it may be mixed with 10X confectioner's sugar in a 1 to 19 ratio and at other ratios for other levels of active compound. These tracking powders were found effective when mice were permitted to walk over areas on which the tracking powder had been placed. Examples of such testing follow:
Mouse Tracking Test Feral mice (*Mus musculus*) were each placed in a double cage system for these evaluations. The two cages of each system were connected by a tunnel. The tracking powder or toxicant was placed in the connecting tunnel and on entry pans. Feed and water were provided *ad libitum*, the water in one compartment of the cage and the feed in the other. An effective single-dose compound will kill 90 percent of the mice within 8 days, of which they are exposed during the first 72 hours.

The results of representative mouse tracking tests of 3-pyridylmethyl-N-4'-nitrophenyl carbamate are shown in Table V.

TABLE V

Tracking Test of
3-Pyridylmethyl-N-4'-nitrophenyl carbamate
Using Feral Mice

| Compound in Tracking Powder | Mice killed within 8 days/ Mice in test | Sample |
| --- | --- | --- |
| 100% | 4/4 | A |
| 50% | 4/4 | A |
| 10% | 4/4 | A |
| 3% | 4/4 | A |
| 1% | 4/4 | A |
| 0.75% | 3/4 | B |
| 0.50% | 2/4 | B |
| 0.25% | 0/4 | B |

Specificity

For general use, we prefer 3-pyridylmethyl-N-4'-nitrophenyl carbamate as it has been found even less toxic to other animals which might inadvertently ingest the rodenticide than the other compounds of the present invention. Since the use of rodenticide on a poultry farm might lead to chickens feeding on the bait, it is significant that we have found this compound to be safe with chickens. For example, sample B of 3-pyridylmethyl-N-4'-nitrophenyl carbamate at 15,000 p.p.m. in the basal ration described above was offered to eight 14-day-old White Leghorn cockerels. On the basis of average feed consumption over a 48-hour period, the compound was found to have been taken at the rate of 800 mg/kg. After initial symptoms of toxicity lasting for less than two weeks, all of the chicks survived with no gross pathology. Apparently the ration containing the compound was unpalatable to the chicks, since the feed consumption of this group during the first week was depressed compared to a control group fed the untreated basal ration.

A similar group of chicks was dosed with the compound via capsule at 4,000 mg/kg; they exhibited stronger symptoms of toxicity than the former group but all recovered within two weeks with no gross pathology.

It is also desirable that a rodenticide be safe in the presence of wild birds, which might inadvertently ingest the bait. Three sets of two adult, male pigeons were dosed via capsule with the aforesaid compound, respectively at 500, 2000, and 4000 mg/kg. All of the pigeons survived, with no gross pathology.

Mammals other than the target species should preferably be unaffected by a rodenticide. When the aforesaid compound (Sample A) was administered in methylcellulose suspension by gastric intubation at levels of up to 1,000 mg/kg, mongrel dogs showed no significant grossly observable symptoms and no methemoglobin formation in the blood.

Having thus described the invention, what it is desired to claim and thereby secure by Letters Patent is:

1. A rodenticidal composition comprising 1) a rodenticidally effective amount of a compound having the formula:

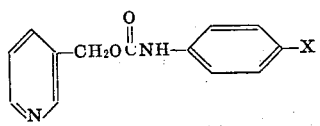

wherein X is selected from the group consisting of $-NO_2$, $-CN$, $-CF_3$, $-SCH_3$, $-SOCH_3$, $-SO_2CH_3$ and $-SO_2NH_2$ and 2) a carrier comprising a semi-moist or dry powered material.

2. A rodenticidal composition in accordance with claim 1, wherein X is $-NO_2$.
3. A rodenticidal composition in accordance with claim 1, wherein X is $-CN$.
4. A rodenticidal composition in accordance with claim 1, wherein X is $CF_3$.
5. A rodenticidal composition in accordance with claim 1, wherein X is $-SCH_3$.
6. A rodenticidal composition in accordance with claim 1, wherein X is $SOCH_3$.
7. A rodenticidal composition in accordance with claim 1, wherein X is $-SO_2NH_2$.
8. A rodenticidal composition in accordance with claim 1, wherein X is $-SO_2CH_3$.
9. A rodenticidal composition in accordance with claim 1, wherein said composition is in the form of a bait which comprises an edible carrier.
10. A rodenticidal composition in accordance with claim 9, wherein X is $-NO_2$.
11. A rodenticidal composition in accordance with claim 9, wherein said compound is present in an amount of 0.05 to 10 percent by weight.
12. A rodenticidal composition in accordance with claim 11, wherein X is $-NO_2$.
13. A rodenticidal composition in accordance with claim 12, wherein the compound is present in an amount between about 0.5 and 1.5 per cent by weight.
14. A rodenticidal composition in accordance with claim 9, wherein said edible carrier is selected from the group consisting of whole ground corn, steel cut oats, sugar, molasses, rice, vegetable oil, salt, dehydrated fruit, fish meal, tankage, wheat, paraffin wax, and mixtures thereof.
15. A rodenticidal composition in accordance with claim 14, wherein X is $-NO_2$.
16. A rodenticidal composition in accordance with claim 1, wherein said composition is in finely divided form to serve as a tracking powder.
17. A rodenticidal composition in accordance with claim 16, wherein X is $-NO_2$.
18. A rodenticidal composition in accordance with claim 16, wherein said compound is present in an amount of at least about 0.75 to 50 per cent by weight and the remainder is a powdered carrier.
19. A rodenticidal composition in accordance with claim 18, wherein X is $-NO_2$.
20. A rodenticidal composition in accordance with claim 18, wherein said powdered carrier is selected from the group consisting of talc, sugar, milk powder, Indian corn meal, fish meal, cornstarch, flour, bentonite, and mixtures thereof.
21. A rodenticidal composition in accordance with claim 20, wherein X is $-NO_2$.
22. A method of exterminating pest rodents which comprises placing a rodenticidally effective amount of a compound of the formula

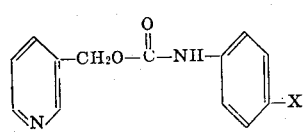

wherein X is selected from the group consisting of $-NO_2$, $-CN$, $-CF_3$, $-SCH_3$, $-SOCH_3$, $-SO_2CH_3$, and $-SO_2NH_2$, in the vicinity of a population of said pest rodents in a place where it may be easily reached and ingested by said pest rodents.

23. The method of claim 22, wherein said compound is in a rodenticidal composition which comprises a mixture of an edible carrier and at least about 0.05 percent by weight of said compound.

24. The method of claim 22, wherein X is $-NO_2$.

25. The method of claim 24, wherein said rodenticidal composition comprises between about 0.5 and 1.5 per cent by weight of the compound, and an edible carrier selected from the group consisting of whole ground corn, steel cut oats, sugar, molasses, rice, vegetable oil, salt, dehydrated fruit, fish meal, tankage, wheat, paraffin wax, and mixtures thereof.

26. The method of claim 22, wherein said rodenticidal composition is exposed for a period of three days and then removed.

27. The method of claim 22, wherein said rodenticidal composition is a finely divided powder and is placed in an area upon which said pest rodents customarily step.

28. The method of claim 27, wherein X is $-NO_2$.

* * * * *